United States Patent [19]

Simmons

[11] Patent Number: 4,890,684

[45] Date of Patent: Jan. 2, 1990

[54] ARTICULATED VEHICLE WITH HINGED JOINT

[75] Inventor: Jack L. Simmons, Richlands, Va.

[73] Assignee: Simmons-Rand Company, Bristol, Va.

[21] Appl. No.: 184,767

[22] Filed: Apr. 22, 1988

[51] Int. Cl.$^4$ ............................................. B62D 5/06
[52] U.S. Cl. ..................................... 180/135; 180/138; 280/492
[58] Field of Search ............... 180/134, 135, 136, 139, 180/8.2, 9.32, 9.4; 280/492, 493, 494, 490 R, 463; 298/20 R; 414/435, 436

[56] References Cited

U.S. PATENT DOCUMENTS

| | | | |
|---|---|---|---|
| 3,414,072 | 12/1968 | Hodges et al. | 180/135 X |
| 3,991,847 | 11/1976 | Unruh | 180/135 |
| 4,444,409 | 4/1984 | Garrison | 280/492 |
| 4,727,949 | 3/1988 | Rea et al. | 280/493 X |

FOREIGN PATENT DOCUMENTS

| | | | |
|---|---|---|---|
| 2424151 | 12/1979 | France | 280/492 |
| 0624815 | 9/1978 | U.S.S.R. | 280/492 |
| 2021058 | 11/1979 | United Kingdom | 180/134 |

Primary Examiner—Charles A. Marmor
Assistant Examiner—Richard Camby
Attorney, Agent, or Firm—David W. Tibbott

[57] ABSTRACT

An articulated vehicle including two wheeled sections hinged together in the middle of the vehicle by a universal movement joint enabling relative pivoting about three axes extending at right angles to each other through the center of the vehicle. A hydraulically operated strut extends between the two vehicle sections and is universally pivoted at its ends to the two vehicle sections to control the relative pivoting of the two vehicle sections about a transverse axis while enabling the middle of the vehicle to be raised or lowered for various reasons. The vehicle is steered by a pair of hydraulically operated steering struts extending between the two vehicle sections on the opposite sides of the universal movement joint.

10 Claims, 5 Drawing Sheets

ARTICULATED VEHICLE WITH HINGED JOINT

BACKGROUND OF THE INVENTION

This invention relates to articulated vehicles used in industrial applications requiring highly maneuverable vehicles that can travel over rough ground. The mining and construction industry is an example of this type of application.

Prior art articulated vehicles include two wheeled sections that are hinged together by a joint that limits the relative pivoting of the two vehicle sections to movement about a vertical axis and otherwise maintains a rigid connection between the two vehicle sections. In addition some prior art vehicles also provide means for the two vehicle sections to pivot relative to each other about an axis extending down the centerline of the vehicle. An example of such means is found in U.S. Pat. No. 4,245,714 which discloses an articulated vehicle with one of the hinged joint members being connected to a second pivoted joint having a pivoting axis extending along the centerline of the vehicle.

Prior art articulated vehicles have also included means for enabling the two vehicle sections to be pivoted relative to each other about a horizontal axis extending transversely through the middle of the vehicle, which is desirable in haulage vehicles for dumping the contents of the vehicle section containing the material being conveyed. U.S. Pat. No. 4,212,365 discloses an articulated vehicle having one side of the vertical axis pivot joint connected to a separate chassis which in turn is hinged on a horizontal transverse axis to the vehicle haulage section. A second embodiment disclosed in this patent mounts one side of the vertical axis pivot joint for vertical linear powered movement relative to the vehicle section supporting that section of the vertical axis pivot joint, all of which makes a very expensive type of construction.

SUMMARY OF THE INVENTION

An object of this invention is to provide an articulated vehicle of the type having two sections pivoted together at its middle and enabling the two vehicle sections to pivot relative to each other about three axes located at right angles to each other while maintaining the middle of the vehicle at the proper horizontal orientation relative to the two vehicle sections.

Another object of this invention is to provide an articulated vehicle providing a hinged connection in its middle enabling relative universal movement between the vehicle sections.

Another object of this invention is to provide a hinged joint for the middle of an articulated vehicle which is relatively less expensive and less complicated than prior art joints of this type.

Another object of the invention is to provide an articulated vehicle having a hinged connection joining two vehicle sections and means for adjusting the relative horizontal orientation of the vehicle sections by raising or lowering the hinged connection as desired by the operator of the vehicle.

DESCRIPTION OF PREFERRED EMBODIMENTS

Figure 1:
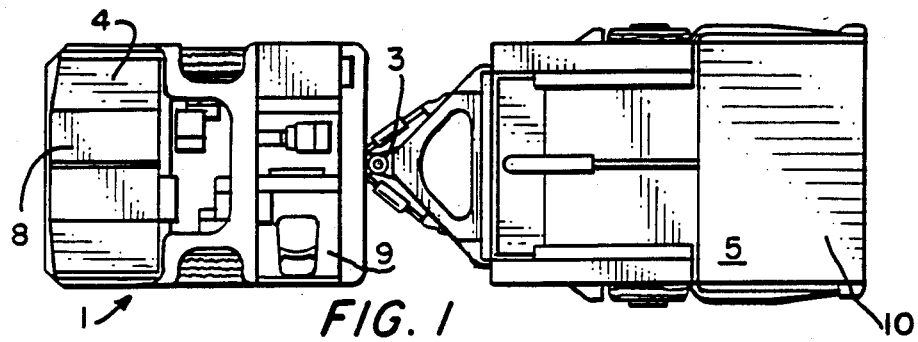
FIG. 1 is a plan view of a conventional articulated vehicle containing the hinge connection of this invention.
Figure 2:
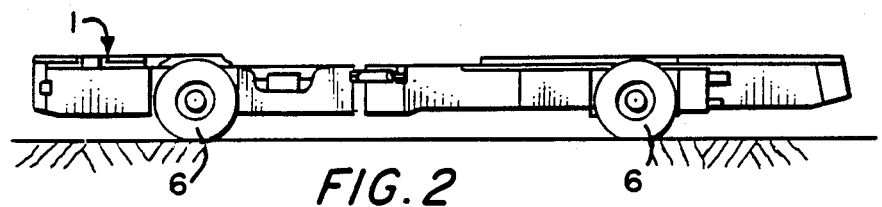
FIG. 2 is an elevation of the articulated vehicle shown in FIG. 1 looking at it from the side of the vehicle.

The articulated vehicle 1 shown in the drawings is a conventional battery-powered vehicle used in the mining industry with the exception of the hinged connection 3 between the front vehicle section 4 and the rear vehicle section 5. Each of the vehicle sections 4 and 5 includes a pair of wheels 6. Looking at FIG. 1, the front vehicle section 4 includes a battery 8 for powering the vehicle and an operator station 9 for receiving the operator of the vehicle. The rear vehicle section 5 includes a material carrying bed 10 similar to a truck. No effort is made to further describe the conventional details of the vehicle 1 since they are unnecessary for understanding the invention.

The front vehicle section 5 includes a rear end 12 that carries a tongue 13 fixed to the rear end 12 and extending horizontally rearwardly therefrom. This tongue 13 carries a pair of bifurcated wing flanges 14 on the opposite sides of the tongue 13 and opening rearwardly. The purpose of these wing flanges 14 will be described later.

The front end 16 of the rear section 5 of the vehicle 1 is triangularly shaped with its apex extending forwardly along the center line of the vehicle and carries a pair of bifurcated forks extending from the apex including a top fork 17 and bottom fork 18 located immediately below and spaced from the top fork 17. Each fork includes a pair of legs 19 and 20 and a pin 21 extending between the legs 19 and 20.

The tongue 13 extending rearwardly from the rear end 12 of the front vehicle section 4 is received in the top fork 17 and the pin 21 extends through an opening in the tongue 13 with a ball and socket bearing 22 interposed between the pin 21 and the tongue 13. The ball and socket bearing 22 is conventional and mounts the tongue 13 for universal movement about the top fork 17. The term "universal movement" means that the tongue 13 can move relative to the fork 17 in three planes extending at right angles to each other.

At this point it is readily seen that the two vehicle sections 4 and 5 can pivot relative to each other about three axes, namely, a vertical axis extending through the hinge connection 3, a horizontal axis extending along the centerline of the vehicle 1 and a horizontal axis extending through the hinge connection 3 at right angles to the centerline of the vehicle. Looking at it in another way, the two vehicle sections 4 and 5 can pivot relative to each other in three planes extending through the hinged connection 3 at right angles to each other, namely, a vertical plane extending along the centerline of the vehicle 1, a horizontal plane extending through the hinge connection 3 and a vertical plane extending transversely to the centerline of the vehicle 1 through the hinge connection 3.

At this point it is easy to recognize that some means must be provided to control the movement of the two vehicle sections 4 and 5 relative to each other in the vertical plane extending through its centerline; otherwise the middle of the vehicle 1 will drop to the ground. Previously, this was done by making the hinge connection 3 of a nature so that it was rigid with respect to movement in the vertical centerline plane.

In this invention the means for controlling the vertical movement of the two vehicle sections 4 and 5 includes a power operated strut 24 (often called a hydraulic cylinder) including a cylinder 25 and a piston rod 26 extending between the two vehicle sections 4 and 5 and located below the previously described tongue 13 connected to the top fork 17. The power strut 24 is spaced below the top fork 17 and is connected to the rear vehicle section 5 by the piston rod 26 being received in the bottom fork 18. The two legs 19 and 20 of the bottom fork 18 are located above and below the piston rod 26 with the pin 21 extending between the legs 19 and 20 and through an opening in the rear end of the piston rod 26. A conventional ball and socket bearing 22 like the one in the top fork 17 is interposed between the pin 21 and the piston rod 26 to provide this joint with universal movement like the previously described joint between the tongue 13 and the fork 17.

The strut 24 extends forwardly from the fork 18 into a pocket or recess 30 provided in the rear end 12 of the front vehicle section 4 and is connected to a bifurcated fork 32 fixed at the front end 33 of the recess 30. The fork 32 is similar to the previously described forks 17 and 18 except that it opens rearwardly and has its two legs 35 spaced horizontally with its pin 36 extending horizontally between the legs 35. The forward end of the cylinder 25 carries a forwardly extending eye rod 37 fixed thereon and received in the fork 32 between the legs 35 and with the pin 36 passing through its eye. In addition, this joint also has a conventional ball and socket bearing 38 interposed between the pin 36 and the eye of the eye rod 37 to provide the joint with universal movement similar to the previously described joints.

The recess 30 is made sufficiently wide to allow the strut 24 to swing horizontally in the recess about the joint located at the fork 32 over a limited arc to allow the two vehicle sections 4 and 5 to pivot relative to each other. Also the recess 30 is sufficiently large in its vertical dimensions to allow the strut 24 to swing in a vertical plane through a limited arc. The need for the swinging of the strut 24 about the fork 32 should become clear later.

The strut 24 is hydraulically controlled to power and lock the movement of the piston 26 in the cylinder 25 in both directions and therefore can control the relative movement of the two vehicle sections 4 and 5 in the vertical centerline plane of the vehicle, i.e., prevent the middle of the vehicle 1 from dropping to the ground. Since the strut 24 can swing side-to-side in the recess 30, it allows the fork 18 to move side-to-side relative to the fork 17 as is necessary for the two vehicle sections 4 and 5 to pivot relative to each other about the centerline axis of the vehicle extending through the fork 17. The strut 24 can also be used to adjust the horizontal orientation of the two vehicle sections 4 and 5 relative to each other such as for raising or lowering the middle of the vehicle. Applications for these type of vehicle adjustments are described later in this specification.

The vehicle 1 is steered by the use of a pair of hydraulically powered struts or cylinders 41 and 42 located on the opposite sides of the hinged joint 3 and extending between the two vehicle sections 4 and 5. The use of hydraulic struts for steering is conventional in articulated vehicles. However, the struts 41 and 42 are located in the horizontal plane extending through the tongue 13 which is different from the location of the steering struts in the prior art vehicles.

Each of the struts 41 and 42 include a cylinder 44 and a piston rod 45. The forward end of each cylinder 44 includes an eye tongue 47 received in a corresponding bifurcated wing flange 14 located at the rear end 12 of the front vehicle section 4 and the resulting joint includes a pin 48 extending between the upper and lower parts of the bifurcated flange 14 with a ball and socket bearing 49 interposed between the pin 48 and the tongue 47 to provide the resulting joint with universal movement in a manner like the previous joints described as having this type of movement.

Figure 3:
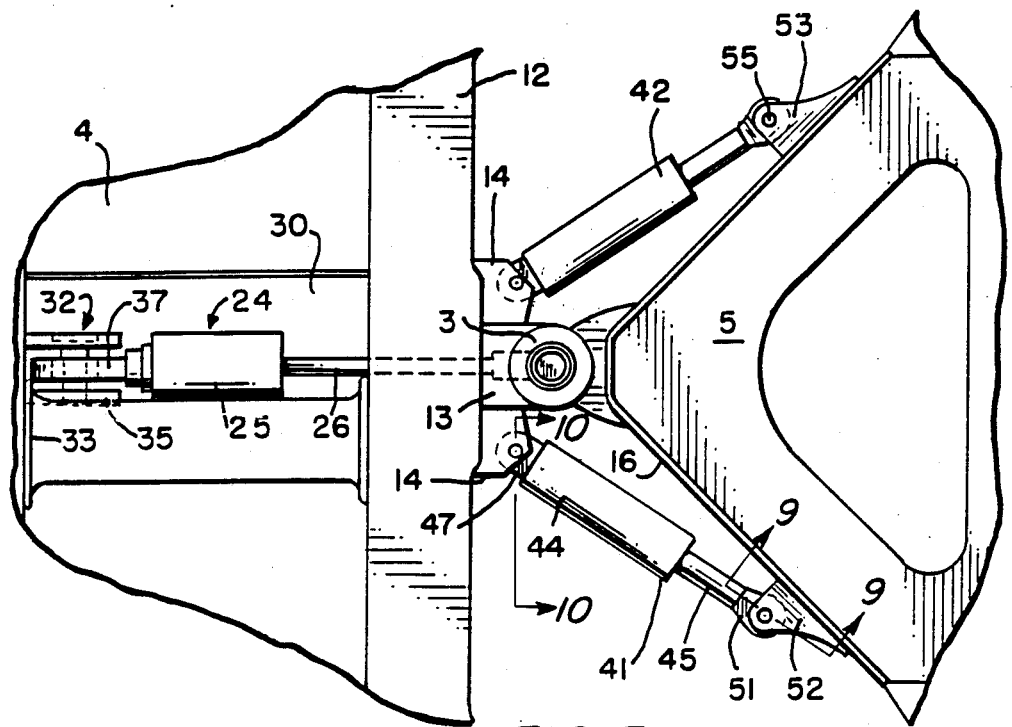
FIG. 3 is an enlarged plan view of the hinged joint between the two sections of the articulated vehicle with portions cut away to reveal parts otherwise hidden.
Figure 4:
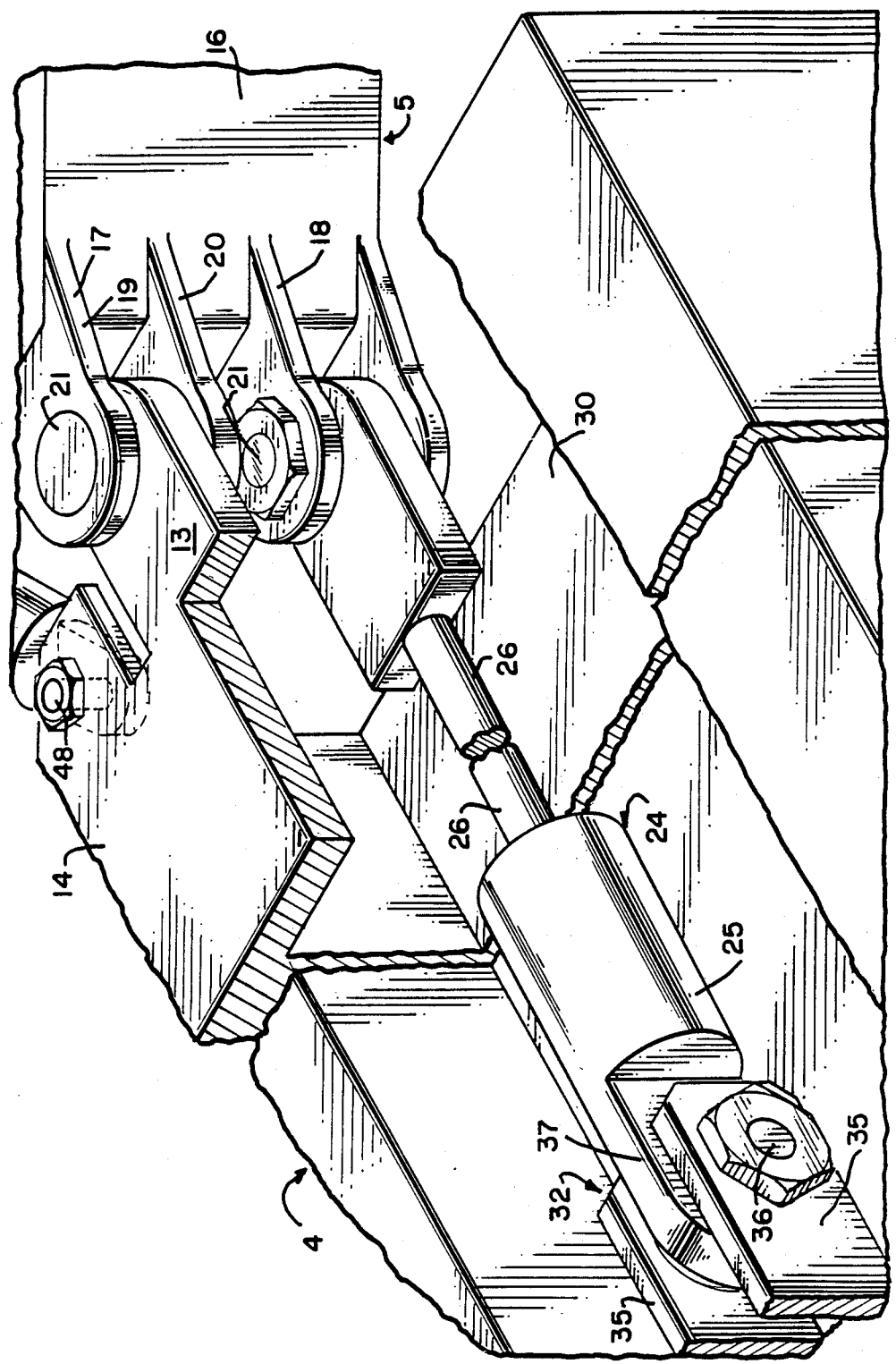
FIG. 4 is a perspective view of the hinged joint with portions cut away to show the details of the swinging power strut.
Figure 5:
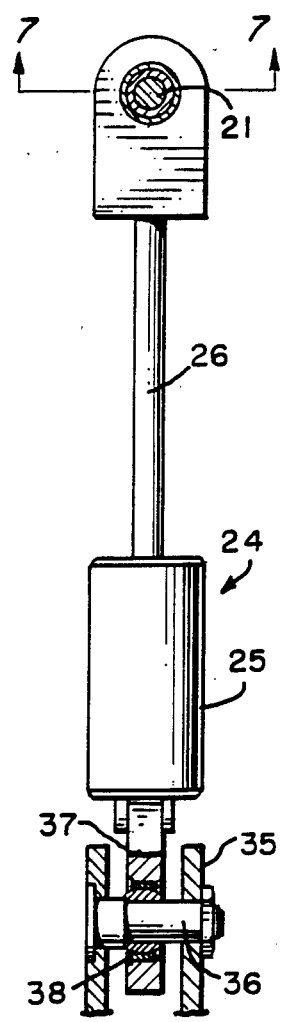
FIGS. 5 and 6 are plan views showing the power strut in alternate positions.
Figure 6:
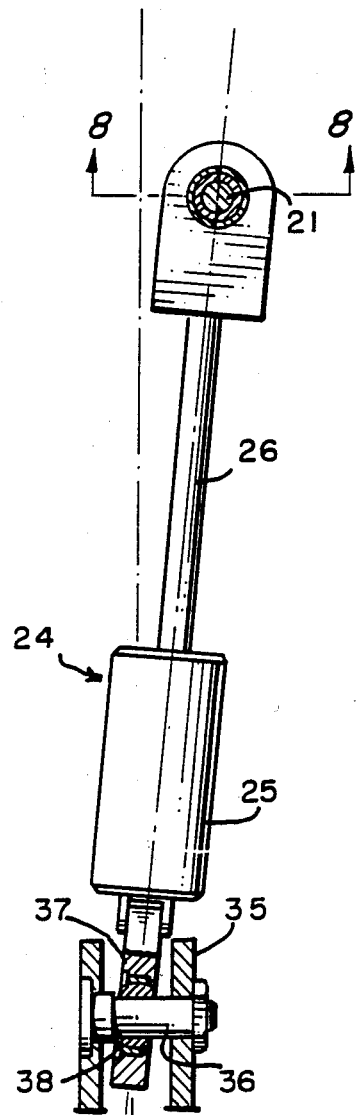
Figure 7:
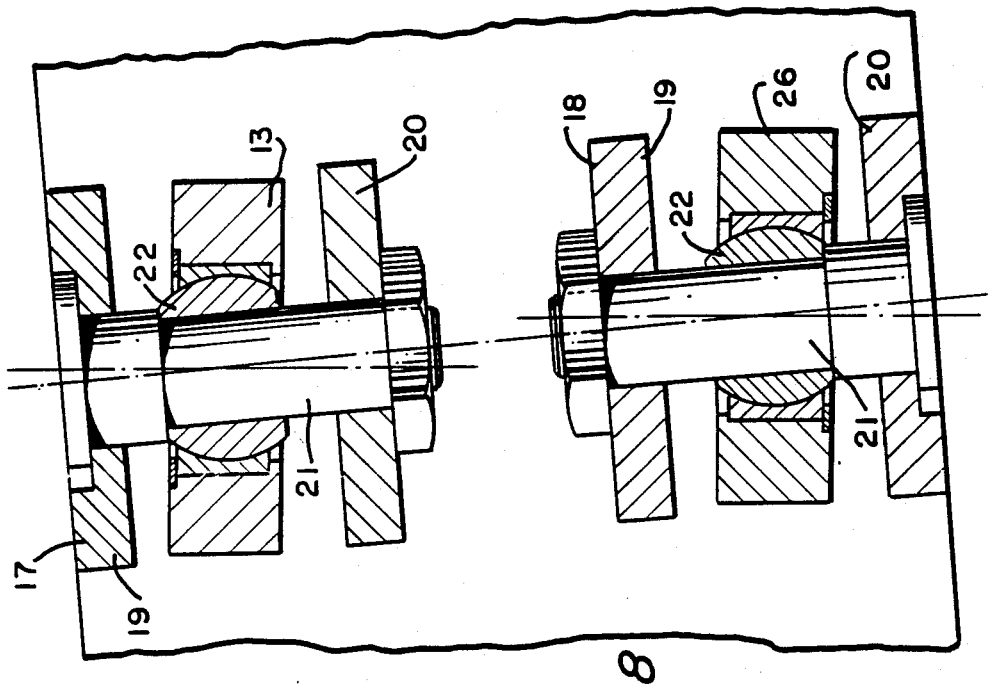
FIGS. 7 and 8 are enlarge sections taken on line 7—7 in FIG. 5 and line 8—8 in FIG. 6, respectively, showing the details of the hinged connection in alternate positions.
Figure 8:
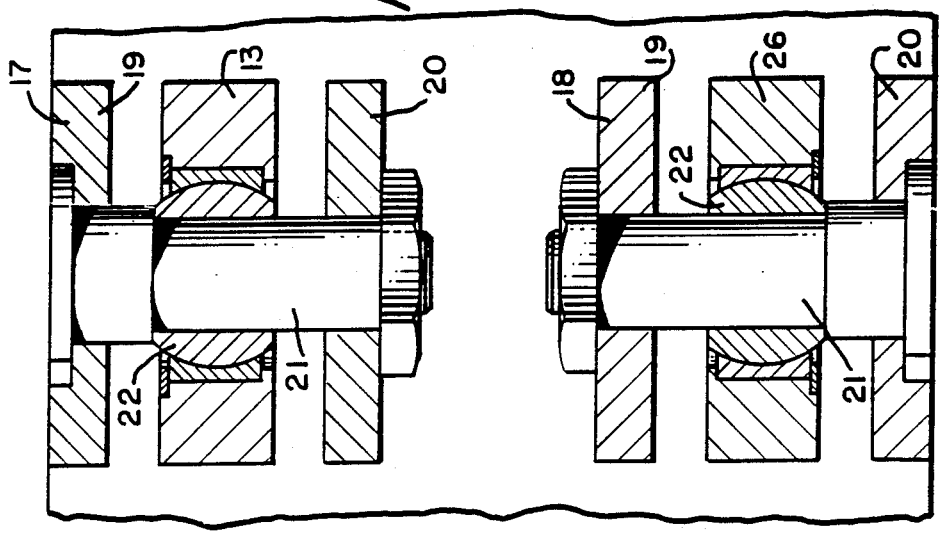
Figure 9:
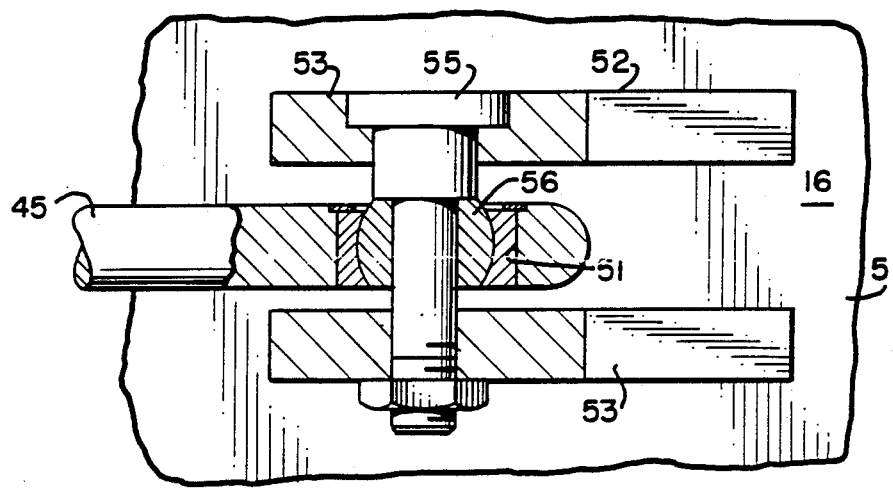
FIGS. 9 and 10 are enlarged sections taken on line 9—9 and 10—10 in FIG. 3, respectively, showing the details of the connections at the opposite ends of a steering strut.
Figure 10:
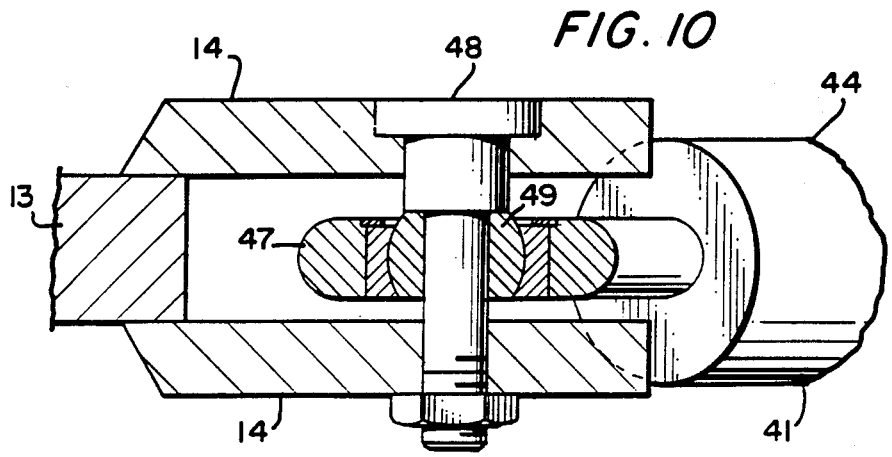

The rear end of each strut 41 and 42 includes a piston rod 45 extending rearwardly and formed with a eye 51 received in a U-shaped bracket 52 having a pair of vertically spaced legs 53 fixed to a rearwardly diverging side of the front end 16 of the rear vehicle section 5, as seen in FIG. 3. The brackets 52 are more widely spaced than the front flanges 14 causing the steering struts 41 and 42 to diverge rearwardly relative to each other and the brackets 41 and 42 are located rearwardly relative to the forks 17 and 18. Each joint formed between the piston rod eye 1 and a bracket 52 includes a pin 55 and a ball and socket bearing 56 arranged like the joints located at the bifurcated wings 14 at the front end of the steering struts 41 and 42 to provide the joint with the previously described universal movement. It appears clear that the joints at the opposite ends of the steering struts 41 and 42 must have universal movement in order to accommodate the relative movements between the two vehicle sections 4 and 5 enabled by the hinged connection 3.

It is best for the steering struts 41 and 42 to be located in the horizontal plane extending through the tongue 13. This location enables them to accommodate relative pivoting of the two vehicle sections 4 and 5 through a reasonable arc about the centerline of the vehicle 1 before the steering struts 41 and 42 move to extreme positions limiting further relative pivoting of the two vehicle sections.

It is believed that this description of the vehicle hinge connection 3 makes it clear that the hinged connection enables the two sections 4 and 5 of the vehicle 1 to pivot relative to each other in a universal manner including pivoting about a vertical axis extending through the joint of the fork 17, a horizontal axis extending along the length of the vehicle 1 through the same joint and a horizontal axis extending transversely to the longitudinal axis and through the same joint. In addition, the strut 24 controls the relative orientation of the two vehicle sections 4 and 5 relative to each other in a horizontal plane while preventing the hinge connection 3 from dropping to the ground and allowing the other relative pivoting movements required of an articulating vehicle.

The novel hinge connection 3 provides the articulated vehicle 1 with important capabilities when used in underground mining. Frequently, underground mining passages are narrow and have low ceilings and rough and undulating floors, causing much difficulty for vehicles traveling through such passages. The ability of changing the horizontal orientation of the articulated vehicle 1 makes it easier for such vehicle to traverse such passages. In traversing a dip or swale in the mine floor the vehicle operator can lengthen the power strut 24 to allow the middle of the vehicle to drop to keep the ends of the vehicle from dragging. To traverse a hump the power strut 24 can be shortened to raise the middle of the vehicle for avoiding such middle from dragging. In the same way, the middle of the vehicle can be dropped for the top of the vehicle to clear obstructions on the ceiling of a passage. The ability of the vehicle to change its horizontal orientation enables the vehicle to be designed with less ground clearance than prior art vehicles of this type resulting in the vehicle having more room for its payload for a passage having a given height.

It has also been found that the power strut 24 can be used to raise or lower the vehicle for raising or lowering the battery compartment to aid in changing the batteries in a battery powered vehicle. Likewise, the vehicle can be raised off of its tires to enable the changing of the tires without the need of using a jack and to allow work to be performed on the floor of a passage under the tires without moving the vehicle to another location. Another use for the ability to raise the middle of the vehicle is for dumping the contents of a vehicle section hauling material. Needless to say, the novel hinge connection 3 has proven to be highly useful in the mining industry.

Although the invention had been described in connection with a wheeled vehicle it will be recognized that the vehicle can be equipped with other types of mobile supports such as crawler tracks.

While only one embodiment of this invention is shown and described in detail, this invention is not limited merely to the specifically described embodiment, but contemplates other embodiments and variations utilizing the concepts and teachings of this invention.

I claim:

1. In an articulated vehicle including a pair of mobile vehicle sections interconnected together by a hinge having a substantially vertical axis allowing the vehicle sections to pivot horizontally relative to each other with said pair of vehicle sections and hinge being arranged so that all relative movement between the pair of vehicle sections takes place through the hinge, the invention comprising: means on said hinge allowing said vehicle sections to pivot vertically relative to each other about an axis transverse to said vertical axis, intersecting with said vertical axis and located in a general horizontal plane, a power-operated reciprocal strut interconnecting said two vehicle sections together in a plane offset from said transverse axis and pivoted at opposite ends to said vehicle sections by joints allowing pivoting of the strut about three axes located at right angles to each other whereby said strut can be extended or retracted to adjust the angular orientation of the two vehicle sections relative to each other in a vertical plane while allowing said sections to pivot relative to each other about both said vertical and transverse axes.

2. In the articulated vehicle of claim 1 wherein the reciprocal strut can be locked in a fixed length between movements to other extended or retracted positions.

3. In the articulated vehicle of claim 2 the invention further comprising a pair of reciprocal power-operated steering struts operable for steering the vehicle, located on the opposite sides of the hinge, extending between the vehicle sections and connected to the vehicle sections by joints at the opposite ends of each strut with each joint allowing pivoting of the corresponding strut relative to the adjacent vehicle section about three axes located at right angles to each other.

4. In the articulated vehicle of claim 3 the invention further comprising locating said steering struts and the transverse axis of the hinge in substantially the same horizontal plane.

5. An articulated vehicle comprising: a pair of mobile vehicle sections, a main universal joint interconnecting the vehicle sections together and allowing the vehicle sections to pivot relative to each other in a universal manner, including movement in three different planes located at right angles relative to each other about three different intersecting axes located at right angles to each other, said pair of vehicle sections and main universal joint being arranged so that all relative movement between the pair of vehicle sections takes place through the main universal joint, said main universal joint being located in a first horizontal plane, a power-operated reciprocal main strut interconnecting said two vehicle sections together and located in a second generally horizontal plane offset from said first horizontal plane, said main strut being connected at opposite ends to said vehicle sections by universal joints allowing pivoting of the main strut relative to said vehicle sections in three planes located at right angles relative to each other whereby said strut can be extended or retracted to adjust the angular orientation of the two vehicle sections relative to each other in a vertical plane while allowing said sections to pivot relative to each other in said universal manner.

6. The articulated vehicle of claim 5 wherein the second horizontal plane of the power-operated main strut is offset below the first horizontal plane of the main universal joint interconnecting the vehicle sections together.

7. The articulated vehicle of claim 6 further comprising a pair of reciprocal power-operated steering struts operable for steering the vehicle, located on the opposite sides of the main universal joint and the main strut, extending between the vehicle sections and connected to the vehicle sections by universal joints at the opposite ends of each steering strut with each joint allowing pivoting of the corresponding steering strut relative to the adjacent vehicle section in a universal manner.

8. The articulated vehicle of claim 7 further comprising locating said steering struts in the first horizontal plane of the main universal joint.

9. An articulated vehicle comprising: a pair of mobile vehicle sections, a main universal joint interconnecting the vehicle sections together and allowing the vehicle sections to pivot relative to each other in a universal manner, including movement in three different planes located at right angles relative to each other about three different intersecting axes located at right angles to each other, said pair of vehicle sections and main universal joint being arranged so that all relative movement between the pair of vehicle sections takes place through the main universal joint, said main universal joint being located in a first horizontal plane, an adjustable length main strut interconnecting said two vehicle sections together and located in a second generally horizontal plane offset from said first horizontal plane, said main strut being connected at opposite ends to said vehicle sections by universal joints allowing pivoting of the main strut relative to said vehicle sections in three planes located at right angles relative to each other whereby said strut can be adjusted to extended or retracted positions to change the angular orientation of the two vehicle sections relative to each other in a vertical plane while allowing said sections to pivot relative to each other in said universal manner.

10. The articulated vehicle of claim 9 wherein the second horizontal plane of the main strut is offset below the first horizontal plane of the main universal joint interconnecting the vehicle sections together.

* * * * *